United States Patent [19]

Le Roux

[11] Patent Number: 5,802,325
[45] Date of Patent: Sep. 1, 1998

[54] MASS MEMORY CARD WITH INPUT/OUTPUT FUNCTION

[75] Inventor: Jean-Yves Le Roux, Bouc Bel Air, France

[73] Assignee: Gemplus Card International, France

[21] Appl. No.: 373,241

[22] PCT Filed: Jul. 7, 1993

[86] PCT No.: PCT/FR93/00705

§ 371 Date: Mar. 20, 1995

§ 102(e) Date: Mar. 20, 1995

[87] PCT Pub. No.: WO94/01822

PCT Pub. Date: Jan. 20, 1994

[30] Foreign Application Priority Data

Jul. 9, 1992 [FR] France .................. 92 08554

[51] Int. Cl.⁶ ........................................ H01J 13/00
[52] U.S. Cl. ............... 395/282; 395/281; 395/309; 395/308; 395/847; 711/115; 235/492
[58] Field of Search ................. 395/280, 281, 395/282, 308, 309, 476, 432, 833, 442, 496, 497.01, 497.02, 842, 843, 830, 828; 235/492, 472

[56] References Cited

U.S. PATENT DOCUMENTS

| 4,744,006 | 5/1988 | Duffield | 361/413 |
|---|---|---|---|
| 4,954,949 | 9/1990 | Rubin | 395/308 |
| 5,226,145 | 7/1993 | Moronaga et al. | 395/425 |
| 5,260,555 | 11/1993 | Sakamoto | 235/492 |
| 5,276,842 | 1/1994 | Sugita | 395/476 |
| 5,361,061 | 11/1994 | Mays et al. | 340/825.44 |
| 5,375,037 | 12/1994 | Le Roux | 361/684 |
| 5,423,086 | 6/1995 | Cannon et al. | 455/186.1 |
| 5,442,704 | 8/1995 | Holtey | 380/23 |
| 5,485,590 | 1/1996 | Hyatt et al. | 395/442 |
| 5,486,687 | 1/1996 | Le Roux | 235/382 |
| 5,515,514 | 5/1996 | Dhuey et al. | 395/282 |
| 5,528,758 | 6/1996 | Yeh | 395/200.08 |
| 5,559,965 | 9/1996 | Oztaskin et al. | 395/284 |
| 5,561,817 | 10/1996 | McCormack et al. | 395/842 |
| 5,572,683 | 11/1996 | Epolite et al. | 395/284 |
| 5,586,270 | 12/1996 | Rotier et al. | 395/282 |
| 5,600,801 | 2/1997 | Parks et al. | 395/282 |
| 5,613,092 | 3/1997 | Lim et al. | 395/500 |

FOREIGN PATENT DOCUMENTS

| A-0275510 | 7/1988 | European Pat. Off. |
| A-0383518 | 8/1990 | European Pat. Off. |
| WO 9013096 | 11/1990 | WIPO |

*Primary Examiner*—Ayaz R. Sheikh
*Assistant Examiner*—Raymond N. Phan
*Attorney, Agent, or Firm*—Nilles & Nilles SC

[57] ABSTRACT

The invention relates to memory cards that can be plugged into personal computers.

Personal computers often have a connector designed to receive a memory extension in the form of a plug-in integrated circuit card. The invention proposes a card structure designed for communications between the computer and the exterior (fax, model, etc.), this card being capable of being plugged into the memory extension connector without any need to change the operation protocol of this connector. The card has a connector (CNC) for connection to the computer, a connector (CNX) for connection with the exterior, an internal microprocessor (MP), a non-volatile memory (MNV) containing programs that can be performed by the microcomputer and containing organizational data relating to all the memories of the card, and a volatile memory containing at least one file used for the transfer of the data elements to be exchanged.

21 Claims, 2 Drawing Sheets

FIG_1
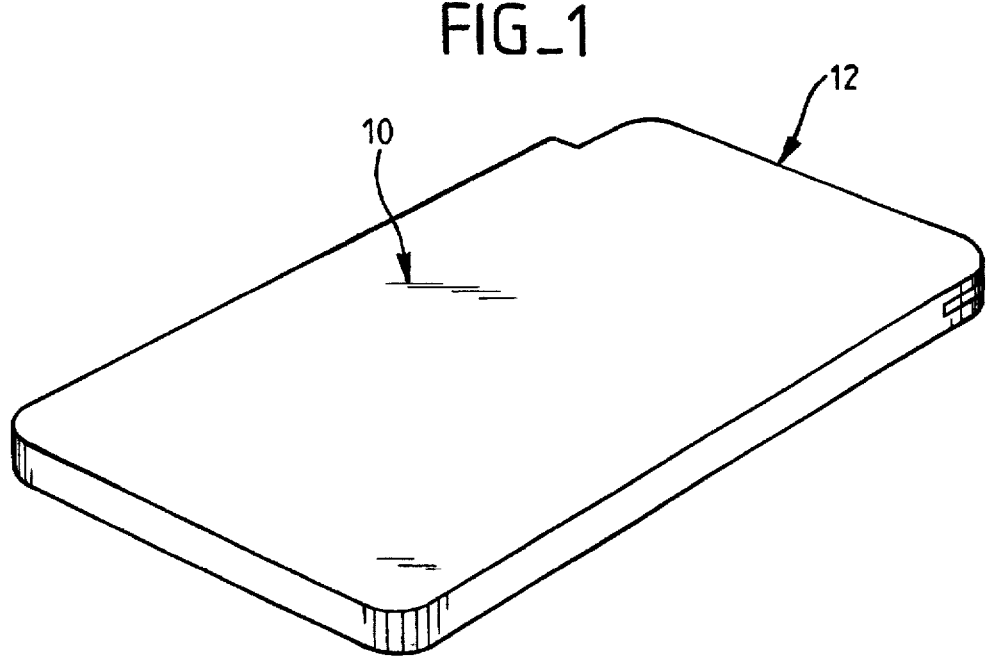
FIG_2
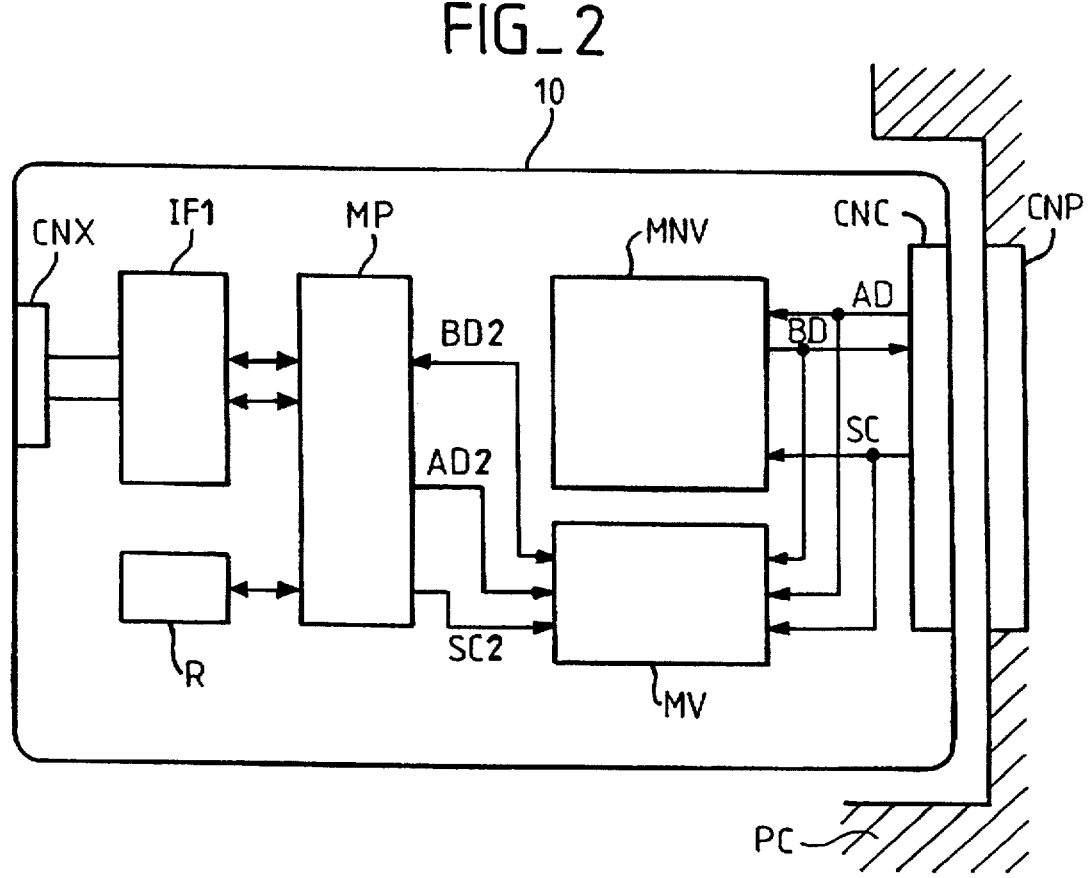

MASS MEMORY CARD WITH INPUT/ OUTPUT FUNCTION

BACKGROUND OF THE INVENTION

Removable mass memory cards for microcomputers (or personal computers or PCs) have appeared recently as accessories for personal computers, especially for portable computers. They could in the future replace diskettes and other magnetic type mass storage means.

They could be used as mass memories with a capacity as great as that of magnetic diskettes (in the range of one million bytes). Their space requirement is no longer great (they have a credit card format, with a thickness of 3 to 5 millimeters). Access to these cards is much faster (several thousands of times faster).

They can even be used as program random-access memories that can be carried out directly by the personal computer. In this case, unlike in magnetic mass memories, they do not have to be loaded into the random-access memory (RAM) of the PC in order to be performed thereafter. The programs that they contain can be carried out directly by the personal computer.

Mass memory cards, sometimes called PC cards, have several memory chips and a connector (a 68-pin female connector according to the PCMCIA standard of the Personal Computer Memory Card International Association, 1030B East Duane Avenue, Sunnyvale, Calif.). The card can be plugged into a corresponding (male) connector of the computer. The connections are such that, the memory can be addressed by a parallel input/output port of the PC, either as if the memory were a magnetic mass memory or as if it were an extension of the random-access memory of the computer.

There furthermore exists cards for personal computers that have functions of communication between the computer and the exterior and that have not only a connector designed to provide for the link with the personal computer but also connection means towards the exterior. These cards are called "input/output function cards" or I/O function cards. The typical example of a communications function is the modem which is connected by a first connector to the computer and by a second connector to a telephone line for the sending of digital data on the line. Another example of a card with a communication function would be a card for a local area network where communication with the exterior is provided not by a connector with physical contacts but by RF transmission in a local environment.

Existing communications cards generally use the RS232C output of the computers, which delivers digital data in serial form that is well suited to communications by modem or by radio; or again the communications cards are directly mounted inside the computer and do not take the form of plug-in cards.

For portable computers especially, and more generally whenever it is sought to save space, it is preferable for the peripheral elements to be mounted in such a way that they can be plugged in and used only when they are needed.

Reference could be made, besides, to the documents EP 0 275 510 and WO 90/13096 in which microprocessor-based cards are used for credit cards, as well as to the document EP 0 383 518 in which a microprocessor-based card enables the loading of a program into an internal memory, this loading being done by means of the microprocessor of the card and a loading program placed in its ROM.

SUMMARY OF THE INVENTION

According to the invention, it is thought that the memory extension connector, which is present on many computers, especially on portable computers, could be used to plug in cards having any communications function, without there appearing any problem of communications protocol through the use of this connector although the connector is not normally designed for this purpose since it is normally designed to constitute a memory extension of the computer.

For this purpose, it is proposed that the card designed to be plugged into a computer should comprise:

an internal microprocessor;

non-volatile memories containing notably work programs that can be performed by the microcomputer, including programs for the transfer of data between the card and the exterior, and format data relating to the organizational structure of the memory files of the card;

a volatile memory (MV) connected to the internal microprocessor by an address bus (AD2), data bus (BD2) and control signals bus (SC2), this memory being also connected to the microcomputer by an address bus (AD), a data bus (BD) and a control signals bus, this memory comprising a physical location reserved for the temporary storage of the data elements to be transferred from the computer to the exterior or from the exterior to the computer, the address of this physical location and the name of the file for this physical location being memorized in the non-volatile memory.

These data elements may be the information elements themselves or instructions for the transfer of information elements as shall be seen further below, i.e. it is possible to place, in the interface file for example, values of 1 or 0 (data to be exchanged), or again instructions for the transfer of 1 and instructions for the transfer of 0.

With this communications card structure, the operation will therefore be done by preserving the normal protocol of signal exchanges that is used between the computer and the external memories: read/write signals, chip selection, address bus, data bus, etc. There is no need to add specific signals designed for communication with the exterior as would have to be done normally.

What is used therefore is the minimum standard of exchanges of data with a memory, without the addition of other specific signals which would have the drawback of depending each time on the type of communication envisaged (modem, fax, radio network, etc.).

It will be noted that the interface file in the volatile memory contains only data or instructions in transit and does not require any any battery or cell for saving data. The data elements that need to be preserved in the memory (for the organization of the files and for the card operation programs) are in the non-volatile memory (ROM, EPROM, EEPROM, Flash EPROM).

The invention is described more specifically with respect to PCMCIA standard cards, but it can obviously be used with other standards of memory cards that can be plugged into a microcomputer.

It will be understood that the invention does not propose the making of a communications card whose only particular feature would be that it would have a connector with the same format as that of a PCMCIA memory card. However, the invention proposes the making of the card in such a way that it can be plugged into the PCMCIA connector that already exists in the computer and has a function which continues to be the function of connection towards an external memory.

Other features and advantages of the invention shall appear from the following detailed description, made with reference to the appended drawings, of which:

BRIEF DESCRIPTION OF THE DRAWINGS

FIG. 1 represents a view of a memory card according to the PCMCIA standard;

FIG. 2 schematically represents the internal constitution of the communications card according to the invention;

DETAILED DESCRIPTION OF THE PREFERRED EMBODIMENTS

Figure 3:
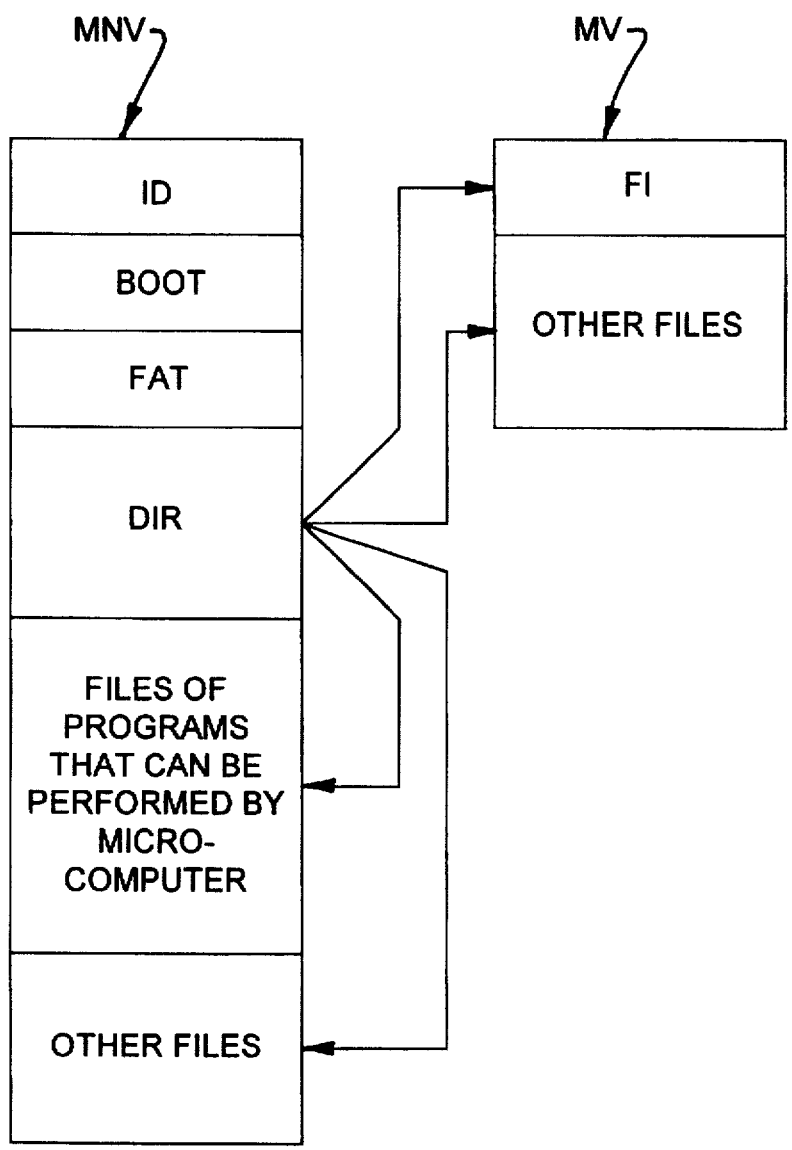
FIG. 3 represents the distribution of the functions between the non-volatile memory and the volatile memory of the card according to the invention.

A mass memory card for a microcomputer, according to the PCMCIA standard, is shown under the reference 10 in FIG. 1. This is a card whose format is approximately that of a credit card (with a surface area corresponding to side dimensions of about 5 cm×8 cm), with a greater thickness (generally 3 to 5 mm), with a connector (reference 12) at the end of the card that can be plugged into a corresponding connector of a microcomputer.

The invention pertains to cards whose function is to enable data communication between the microcomputer and the exterior. This card therefore has electronic circuits enabling this communication to be carried out and notably has an additional connector. If the communication with exterior is carried out by electromagnetic means (RF communication in metric waves, microwave communication in decimetric to millimetric waves), then the card does not, properly speaking, have an additional connector. However, it has an RF transmission/reception antenna to fulfil the function of this connector.

A communications card according to the invention is shown schematically in FIG. 2. It is a card that has memories MNV, MV, and a microprocessor MP. The cards are of two types, volatile memories (RAMs) and non-volatile memories (ROMs or EPROMs or EEPROMs or flash EPROMs in the current technology). The figure shows only one non-volatile memory MNV and one volatile memory MV but, obviously, each of these memories can be made with several integrated circuit chips if the memory capacity required is too high for only one chip.

The microprocessor carries out tasks under the control of programs that are stored in its own program memory (ROM) referenced R. These programs include programs enabling the communication of data between the card and the exterior by means of a connector CNX. The microprocessors is connected to the connector CNX by means of an interface circuit IF1.

According to an alternative embodiment, the microprocessor could have its control programs recorded in the non-volatile memory MNV. The microprocessor would then be connected to this memory by an address and data bus in the same way as with the program memory R.

The volatile memory MV and the non-volatile memory MNV can communicate directly with the microcomputer PC by means of the connector CNC (corresponding to the connector 12 of FIG. 1) which is plugged into the complementary connector CNP of the microcomputer. However, the microprocessor MP cannot communicate directly with the microcomputer.

FIG. 2 gives a schematic view of these possibilities of communication: the internal microprocessor is connected to the volatile memory by an address bus AD2, a data bus BD2 and a control signals bus SC2. The memories are furthermore accessible by the personal computer PC, through an address bus AD, a data bus BD and a control signals bus, these three buses coming from the connector CNC.

According to the invention, the card behaves like a memory card seen from the microcomputer side: it contains volatile and non-volatile memory files and a structure of organization of these files exactly as if this electronic card were nothing but a flexible magnetic disk or a hard disk.

Furthermore, the function of the memories MNV and MV is determined as follows: the non-volatile memory contains not only programs that can be performed by the microcomputer PC but also all the data relating to the organization of the memories of the card, namely data enabling the microcomputer PC to understand its organization (just as a magnetic diskette, in its initial tracks, contains general data relating to the organization of the files of the diskette).

In particular, if we refer to the standard organization of mass memory files in microcomputers working under DOS systems, the data relating to the organization of the memory could generally comprise:

- possibly an identification file ID by which the microcomputer can know the type of card to which it is connected;
- a BOOT file referenced;
- a FAT (file allocation table) file defining the plan of occupancy of the memory by all the files, namely the physical location of the different files;
- a DIR file which is the root directory containing information on the files: the names of the files (name and extension), the size of the file, the date and time of creation or modification of the file, the possible attributes of the file (hidden file or non-hidden file, etc.);
- a BIO file which is a system file not accessible to the user;
- and finally all the usable files, most of which are in a non-volatile memory and at least one of which is in a volatile memory. Among these files, there may be of course a start-up file (AUTOEXEC.BAT) which will look for the executable files enabling the application to be launched.

Consequently, according to the invention, the card contains all these organization data elements in the non-volatile memory MNV and the operating programs that can be directly performed by the microcomputer are all (or in certain cases almost all) also in the non-volatile memory. The name, physical location and other attributes of each program file are therefore in a non-volatile memory.

Finally, in the non-volatile memory, there are the organization data elements relating to an interface file FI. The name of this file is stored in the non-volatile file DIR, the address of its physical location is defined in the non-volatile file FAT. The physical location of this interface file is in the volatile memory MV.

This interface file is used for the temporary storage of the data elements to be transferred from the computer PC to the exterior or from the exterior to the computer by means of the card or, possibly, of instructions for the transfer of data (i.e., instead of containing data elements 1 or 0, the file may receive instructions such as "transfer of 1", "transfer of 0", etc. that can be interpreted by the internal microprocessor).

The volatile memory MV is a dual-access memory: the computer PC can record or read therein the data elements or instructions that can be interpreted by the internal microprocessor and the internal microprocessor MP can also read or write data elements or instructions therein under the control of read or write programs contained in its own program memory R.

The non-volatile memory may or may not be a dual-access memory as the case may be.

The working of the communications card is then, for example, as follows: the computer PC may attempt the writing, in the interface file, of a data element to be transmitted to the exterior or a data transmission instruction. This writing operation may be detected by the internal microprocessor MP. This internal microprocessor is activated by this detection. It then takes over control to carry out its internal program under the control of the non-volatile memory. This program is, for example, a program of transmission towards the exterior (through the connector CNX) of the data element received by the interface file. The microprocessor therefore reads the data elements written in the volatile file of the memory MV and it transmits them to the connector CNX by means of the interface circuit. When the task is ended, the microprocessor restores control to the microcomputer. Conversely, if data are to be received and transmitted to the computer, the microprocessor will carry out a transfer program in the other direction. It will write the data elements in the volatile file of the interface memory and restore control to the microcomputer so that it can read them.

The communication between the computer PC and the card is therefore solely the standard communication of the memory card, enabling the reading or writing in the chosen files, as it happens especially in the interface file FI.

It is not necessary to make provision, in the communications protocol between the computer and the card, for signals other than the exchange signals with a simple memory card: an address bus, data bus, read/write signal, unit selection signal, etc. It is therefore possible to use the memory extension connector of the computer PC, even in order to place a communications card (modem, fax, etc.) therein.

This communications card has both non-volatile memory and volatile memory, like many memory cards but unlike these cards it does not require any cell or battery to save the contents of the volatile memory. Indeed, this card does not have any data that needs to be preserved after use. In principle, it keeps only the data elements or instructions transmitted between the computer and the exterior as and when the operation goes ahead.

A particular application of the present invention apart from communications with a telephone line is the following one: the communications card is a credit card reader with flush contacts, namely the card has not only a connector that can be plugged into a corresponding connector of the computer but also a connector with six or eight contacts capable of receiving a flat chip card with a credit card format having six or eight flush contacts. By the system according to the invention, it is possible for example to read the contents of the card with flush contacts or to make the microcomputer carry out programs contained in this card or again to write in the flush contact card, etc.

For example, the operation may be as follows: the computer writes an instruction intended for the internal microprocessor in the interface file. This instruction may be a "four-byte reading of the memory of the card with flush contacts". The microprocessor "awakened" by this writing operation will interpret the instruction. The bytes read are transferred into a file of the volatile memory and may be read by the computer.

The data elements thus recovered from the exterior by the connector CNX can thus be placed either in the same interface file FI as the data elements or instructions sent out from the computer PC or in another file, also in the volatile memory MV. This other file also has its organization parameters (name, extension, location, etc.) placed in a non-volatile memory MNV.

In a particular exemplary embodiment, the volatile memory MV has a first file designed to receive instructions that can be interpreted by the internal microprocessor, and a second file designed to contain data elements to be exchanged between the microcomputer PC and the exterior.

I claim:

1. A communication card designed to be plugged into a microcomputer, the communication card comprising
   an internal microprocessor in communication with an external device;
   non-volatile memories, the non-volatile memories and the microcomputer sharing at least three common buses, including a first address bus, a first data bus and a first control bus, the non-volatile memories having work programs that are executable by the microcomputer, including programs for the transfer of data between the communication card and the external device, and format data relating to organizational structure of memory files of the communication card; and
   a dual access volatile memory which is directly accessible both by the microcomputer and by the internal microprocessor.

2. The communication card according to claim 1, comprising a first connector enabling the plugging of the communication card into the microcomputer and a second connector enabling communication between the communication card and the external device;
   and wherein the dual access volatile memory is connected to the internal microprocessor by a second address bus, a second data bus and a second control bus, the dual access volatile memory being also connected to the microcomputer by the first address bus, the first data bus and the first control bus, the dual access volatile memory further comprising a physical location reserved for temporarily storing data elements to be transferred from the microcomputer to the external device or from the external device to the computer, the physical location having an address and a file name which are memorized in the non-volatile memory.

3. The communication card according to claim 1, wherein substantially all data elements received by the internal microprocessor from the external device which are awaiting retrieval by the microcomputer are stored in the dual access volatile memory.

4. The communication card according to claim 1, wherein the dual access volatile memory temporarily stores data elements which are exchanged between the microcomputer and the external device.

5. The communication card according to claim 1, further comprising a first connector enabling the plugging of the communication card into the microcomputer and a second connector enabling communication between the communication card and the external device, and wherein the first connector is a female memory card connector disposed on an edge of the communication card.

6. The communication card according to claim 1, further comprising a first connector enabling the plugging of the communication card into the microcomputer and a second connector enabling communication between the communication card and the external device, and wherein the second connector is a connector for connection with a chip card having flush contacts, and wherein the programs in the non-volatile memory include programs for reading and writing data elements in the chip card.

7. The communication card according to claim 5, wherein the female memory card connector is a 68-pin female connector.

8. A communication card designed to be plugged into a microcomputer, the communication card comprising:
   an internal microprocessor;

non-volatile memories connected to the microcomputer by a first address bus, a first data bus and a first control bus, the non-volatile memories having work programs that are executable by the microcomputer, including programs for the transfer of data between the communication card and an external device, and format data relating to organizational structure of memory files of the communication card;

a first connector enabling the plugging of the communication card into the computer and a second connector enabling communication between the communication card and the external device; and a volatile memory connected to the internal microprocessor by a second address bus, a second data bus and a second control bus, the volatile memory being also connected to the microcomputer by the first address bus, the first data bus and the first control bus, the volatile memory further comprising a physical location reserved for temporarily storing data elements to be transferred from the microcomputer to the external device or from the external device to the computer, the physical location having an address and a file name which are memorized in the non-volatile memory;

and wherein the second connector is a connector for connection with a chip card having flush contacts, and wherein the programs in the non-volatile memory include programs for reading and writing data elements in the chip card.

9. A communication card designed to be plugged into a microcomputer, the communication card comprising:

an internal microprocessor in communication with an external device;

a non-volatile memory, the non-volatile memory being directly accessible by the microcomputer by way of a first address bus, a first data bus, and a first control bus on which the non-volatile memory and the microcomputer are commonly disposed, and the non-volatile memory storing executable programs and format data relating to organizational structure of files stored in the communication card;

dual access volatile memory, the dual access volatile memory being directly accessible by the microcomputer by way of the first address bus, the first data bus, and the first control bus on which the dual access volatile memory is also commonly disposed with the non-volatile memory and the microcomputer, and the dual access volatile memory being directly accessible by the internal microprocessor by way of a second address bus, a second data bus, and a second control bus on which the dual access volatile memory and the internal microprocessor are commonly disposed;

a first connector which connects the microcomputer to the first address bus, the first data bus, and the first control bus; and a communication device which permits the communication between the internal microprocessor and the external device.

10. The communication card according to claim 9, wherein the format data in the non-volatile memory comprises:

a file allocation table which describes locations of the executable programs and data files in the non-volatile memory; and a directory file which contains information pertaining to the executable programs and the data files in the non-volatile memory, including naming information and creation/modification time information.

11. The communication card according to claim 9, wherein the dual access volatile memory comprises a temporary storage location for temporarily storing data elements to be transferred from the external device to the microcomputer, wherein the data elements are written in the temporary storage location by internal microprocessor without the assistance of the microcomputer, and wherein the data elements are read from the temporary storage location by the microcomputer without the assistance of the internal microprocessor.

12. The communication card according to claim 9, wherein the dual access volatile memory comprises a temporary storage location for temporarily storing data elements to be transferred from the microcomputer to the external device, wherein the data elements are written in the temporary storage location by microcomputer without the assistance of the internal microprocessor, and wherein the data elements are read from the temporary storage location by the internal microprocessor without the assistance of the microcomputer.

13. The communication card according to claim 9, wherein the communication device is a second connector, wherein the second connector is adapted for connection with a chip card having flush contacts, and wherein the non-volatile memory includes programs for reading and writing data elements in the chip card.

14. The communication card according to claim 9, wherein the communication device is an antenna.

15. The communication card according to claim 9, further comprising a program memory, the program memory being coupled to the internal microprocessor, and the program memory storing programs which permit the communication of data between the communication card and the external device.

16. The communication card according to claim 9, wherein the non-volatile memory is also dual access memory.

17. The communication card according to claim 11, wherein the temporary storage location has an address and a file name which are memorized in the non-volatile memory.

18. A method of communicating between a microcomputer and an external device by way of a communication card, the method comprising the steps of:

storing executable programs and format data in a non-volatile memory which is disposed on said communication card and which is directly accessible by the microcomputer, the non-volatile memory being directly accessible by the microcomputer by way of a first address bus, a first data bus, and a first control bus on which the non-volatile memory and the microcomputer are commonly disposed, and the format data relating to organizational structure of files stored in the communication card;

directly writing data elements in a dual access volatile memory with the microcomputer, the dual access volatile memory being disposed on the communication card;

ascertaining that the microcomputer has written data elements in the dual access volatile memory, the ascertaining step being performed by an internal microprocessor of the communication card;

in response to the ascertaining step,
taking control of the dual access volatile memory,
directly reading the data elements from the dual access volatile memory,
transmitting the data elements to the external device, and
restoring control of the dual access memory to the microcomputer,
the taking, reading, transmitting, and restoring steps being performed by the internal microprocessor.

19. The method according to claim 18, further comprising the steps of providing the communication card with a second connector, the second connector being adapted for connection with a chip card having flush contacts, and providing the non-volatile memory with programs for reading and writing data elements in the chip card.

20. The method according to claim 18,
wherein the dual access volatile memory is also commonly disposed on the first address bus, the first data bus, and the first control bus along with the non-volatile memory and the microcomputer, and
further comprising the step of commonly disposing the dual access volatile memory and the internal microprocessor on a second address bus, a second data bus, and a second control bus.

21. The method according to claim 18, wherein during the directly writing step, the data elements are directly written in a temporary storage location which has an address and a file name that are memorized in the non-volatile memory.

* * * * *